Nov. 9, 1943.  H. C. OHLSEN  2,333,880
TIRE TOOL
Filed Dec. 3, 1941   2 Sheets-Sheet 1
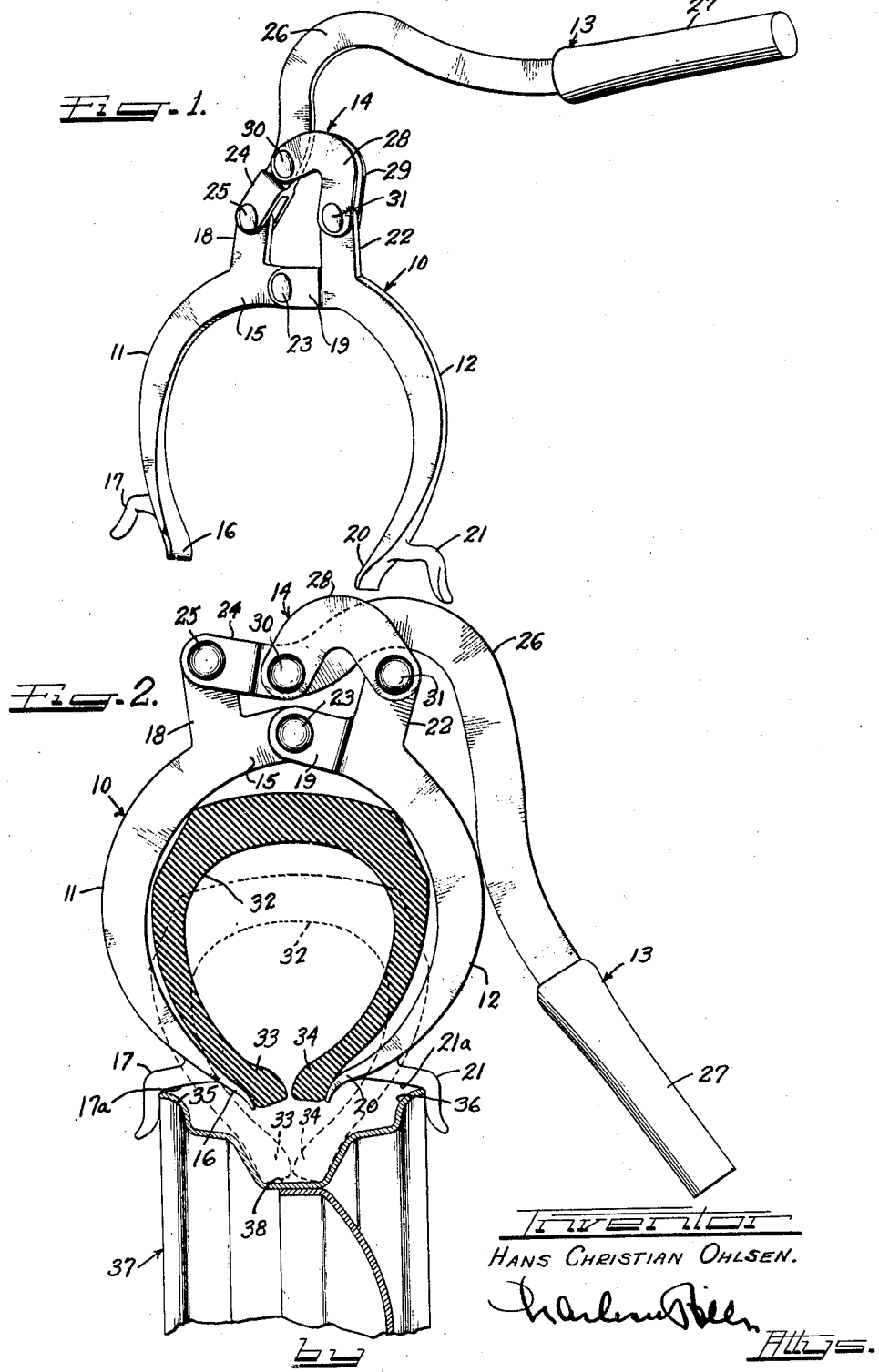
Inventor
HANS CHRISTIAN OHLSEN.

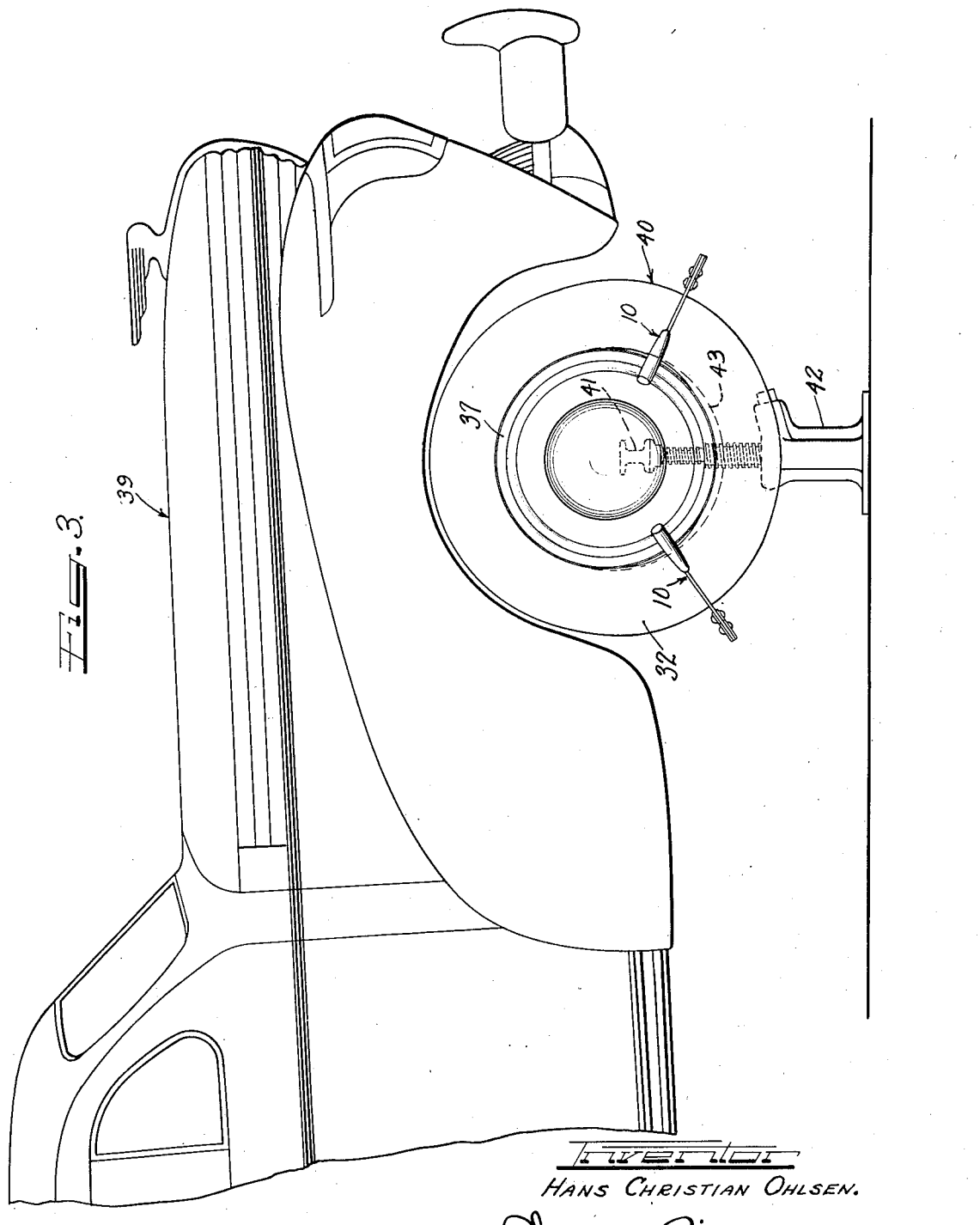

Patented Nov. 9, 1943

2,333,880

UNITED STATES PATENT OFFICE 2,333,880

TIRE TOOL

Hans Christian Ohlsen, Dubuque, Iowa

Application December 3, 1941, Serial No. 421,416

1 Claim. (Cl. 157—6)

The present invention relates to a novel tool construction and more particularly to a tire tool for aiding in the removal from or the mounting of a tire on the rim of a vehicle wheel.

The present invention seeks to provide a tire tool which may be applied to a tire without removing the wheel from its mounting, such as on the axle of a vehicle or on a work stand, for the purpose of breaking the bond between the tire beads and the rim flanges. This operation thereby permits removal of the tire casing and the inner tube from the mounted wheel for such repairs as are required. After the repairs are made, the inner tube and tire casing may be mounted on the wheel and rim by the use of the tool of this invention. It will readily be apparent from the foregoing that the elimination of removing the wheel from its mounting saves considerable time and avoids marring of the hub cap or finish of the wheel rim.

Generally, the tool of the present invention includes pivotally connected members of such configuration as to encircle the exposed portion of a tire when mounted on the rim of a wheel. The free ends of the members are brought into engagement with adjacent portions of opposite beads on the tire. An actuating member is connected to the pivoted members by a toggle arrangement whereby the pivoted members are moved toward each other to break the beads of the mounted tire away from the flanges of the rim. Once the beads are so loosened, the entire casing and inner tube may be removed from the mounted wheel in much the same manner as previously described.

Another object of the present invention is the provision of an improved tool for loosening the beads of a tire when bonded to the flanges of a rim through corrosion of the latter without injury to the tire.

Still another object of this invention is the provision of an improved tool having relatively movable parts with portions thereon for effecting lateral pressures against opposite bead portions of a tire and with other portions for co-acting with a rim on which the tire is mounted for limiting the relative movement of the first portions.

Still another object of the invention is the provision of an improved tool having portions for loosening bead portions of a tire from a wheel rim and having other portions for coacting with the rim for lifting the beads therefrom during the loosening operation.

The novel features believed to be characteristic of the present invention are set forth with particularity in the appended claim. The invention itself, however, both as to its organization and manner of construction, together with further objects and advantages thereof, may best be understood by reference to the following description taken in connection with the accompanying drawings, in which:

Figure 1 is a perspective view of a tire tool constructed in accordance with the principles of this invention and shown in an open position;

Figure 2 is an enlarged side view of the tire tool illustrated in Figure 1 shown in its applied position relative to a tire and a tire rim whereby the tire beads are loosened from the rim flanges; and, Figure 3 is a fragmentary side view of a vehicle and of a wheel and tire assembly illustrating the manner in which one or more of the tire tools of Figure 1 may be applied to a tire for removal thereof from the wheel without removing the wheel from the vehicle.

As best illustrated in Figures 1 and 2, the tool construction 10 of the present invention generally includes a pair of pivotally connected members 11 and 12, an actuating handle 13 and a toggle arrangement 14.

The member 11 is longitudinally curved and is so shaped as to provide a flat end 15 from which it gradually tapers to its other end 16 where it is flattened in a plane substantially at right angles to the plane of the end 15. An outwardly and downwardly extending arm or lug 17 is provided on the member 11 adjacent its flattened free end 16. This arm or lug may be integrally formed on the member 11 or connected thereto by means of welding or the like. A substantially radially extending arm 18 is provided adjacent the opposite end 15 of the member 11 for a purpose to be more fully described hereinafter.

The member 12 is shaped similar to the member 11 by being curved longitudinally and having a flattened end 19 from which the member is longitudinally tapered toward a flattened free end 20. The flattened end 20 lies in a plane right angularly disposed to the plane of the flat end 19. An outwardly and downwardly extending arm or lug 21 is provided adjacent the end 20 and is integrally formed thereon or connected thereto by means of welding or the like in a manner similar to the arm or lugs 17 on the member 11. Likewise, a substantially radially extending arm 22 is provided on the member 12 adjacent its end 19.

The laterally extending portion of the arm 17 slopes slightly downward along the edge 17a. Likewise, the laterally extending portion of the arm 21 also slopes slightly downward along the edge 21a. The purpose of these sloping edges will be described in greater detail hereinafter.

It is to be noted that the end 19 of the member 12 is offset laterally approximately its own thickness in order that the members 11 and 12 may be pivotally connected together to lie in a single plane. A pivot pin 23, rivet or the like, pivotally connects the ends 15 and 19 together.

The actuating member 13 has a bifurcated end 24 which straddles the arm 18 of the member 11 and is pivotally connected thereto by means of a pivot pin 25, rivet or the like. An intermediate portion 26 of the actuating member is curved to provide clearance with the arm 22 when the actuating member is rocked around its pivot 25. The actuating member also terminates in a handle grip 27 which may be formed of metal integrally with the flattened portion thereof or, if desired, may be separately shaped of rubber or other plastic or similar material.

A pair of links 28 and 29, substantially V-shaped in side view, have their adjacent ends straddling and pivotally connected to the actuating member adjacent the bifurcated end 24 by means of a pivot 30, rivet or the like. The opposite adjacent ends of the links 28 and 29 straddle and are pivotally connected to the arm 22 of the member 12 by means of a pivot pin 31, rivet or the like.

Figure 1 illustrates the relative position of parts when the tire tool 10 is in an open position. When the operator grasps the handle 27 and raises it, the pivot 30 is actuated away from the pivot 23 while the pivot 31 is actuated toward a line passing through the pivots 23 and 30. This relative movement of the pivots is effected by their interconnecting elements and results in the ends 16 and 20 of the members 11 and 12 being moved away from each other.

Figure 2 illustrates the relative position of parts when the tire tool 10 has been actuated to a closed position. The operator merely grasps the handle 27 and forces it downwardly whereby the pivot 30 is moved toward the pivot 23 while the pivot 31 is moved away from a line passing through the pivots 23 and 30. This relative movement of the pivots is effected by their interconnecting elements and results in the free ends 16 and 20 of the members 11 and 12 being actuated toward each other.

It will be noted that the links 28 and 29 together with the end of the actuating member 13 pivotally connected to the member 11 effect a toggle arrangement. When this toggle arrangement has been actuated to a position in which the members 11 and 12 are moved away from each other, the pivot 30 lies above a line through the pivots 25 and 31. However, when the actuating member 13 has been moved downwardly whereby the toggle arrangement actuates the members 11 and 12 toward each other, the pivot 30 lies below a line through the pivots 25 and 31. Obviously, any outward pressure exerted on the ends 16 and 21 of the members 11 and 12 will tend to urge the pivot 30 downwardly and away from a line through the pivots 25 and 31. Consequently, once the pivot 30 is actuated below the dead-center of the pivots 25 and 31, the members 11 and 12 are automatically locked in their actuated positions.

Figure 3 illustrates the manner in which the tire tool 10 is applied to a tire and rim on a wheel mounted on the axle of a vehicle. Figure 2 illustrates in greater detail the operative relation of parts when the tire tool is so applied. To effect the operative relation of parts in this latter figure, it is first necessary to actuate the tire tool 10 to an open position as shown in Figure 1. The tire tool is then applied around a tire 32 so that the members 11 and 12 straddle the exposed portion of the tire with their ends 16 and 20 positioned between the beads 33 and 34 and the flanges 35 and 36 of a rim 37 on which the tire is mounted. The rim 37 is illustrated as being of the usual drop-center type having a center wall 38.

The actuating handle 27 is then moved downwardly by the operator whereby the flattened ends 16 and 20 exert lateral pressure against the beads 33 and 34 to urge them toward each other. During this relative movement of the members 11 and 12, the outwardly extending portions of the arms 17 and 21 rest on the peripheral edges of the rim flanges 35 and 36 while the downwardly extending portions of the arm finally engage against the outer sides of the rim 37 to limit movement of the members 11 and 12 toward each other. As the edges 17a and 21a slide along the peripheral edges of the rim, the tire beads 33 and 34 are lifted vertically. If necessary, the faces of the ends 16 and 20 may be striated (not shown) to eliminate any relative movement between the ends of the tire tool and the tire beads. The downwardly extending portions of the arms 17 and 20 are so spaced that when they engage the outer sides of the rim the toggle pivot 30 has been moved below dead-center thereby locking members 11 and 12 in their actuated positions.

The necessity for breaking the beads 33 and 34 of the tire 32 away from the rim flanges 35 and 36 is usually occasioned by an oxidized bond therebetween formed on the surfaces of the rim flanges. This oxidation usually results from a constant seepage of water between the outside of the tire bead and the rim flanges as the vehicle is operated. This water seepage is usually the result of operating the vehicle during rainy weather or over ground covered by standing or running water. The amount of seepage often depends on the inflation of the tire, and the lower the inflation the greater the seepage. As the metal surfaces of the rim flanges 35 and 36 oxidize, the inflation and operating pressures on the tire beads tend to force the beads against the rim flanges so that the corrosive coating impregnates the outer surfaces of the tire beads and causes a bond between the tire and the rim.

The use of a sharp flat tire tool for breaking this bond has been highly unsatisfactory as in working the tool between a tire bead and the rim flange against which it is seated usually causes tearing or cutting of the tire before sufficient leverage can be obtained to break the tire bead away from the rim flange. Any slight failure of the tire at this point usually results in complete tire failure thereafter as the tire beads and side walls are subjected to constant vertical and lateral deflections during vehicle operation. Furthermore, such a tire failure would be hazardous particularly at high vehicle speeds as it usually results in a wreck and often with loss of life.

It will be noted in Figure 2 that the ends 16 and 20 of the members 11 and 12 are so flattened as to engage a substantial circumferentially extending portion of the tire beads whereby lateral pressures exerted thereagainst will not cause failure or rupture either in the rubber or in the fabric. Furthermore, when the beads 33 and 34 are forced away from the rim flanges and toward each other they are lifted vertically. This lateral and vertical displacement of the tire beads exerts pressure on portions of the tire beads for a considerable distance circumferentially therearound. It has been found in actual test that the use of one tire tool 10 subjects the tire beads to sufficient lateral and vertical pressure around their entire circumference so that the application of the tire tool at one point is usually sufficient to loosen the entire tire on the rim. However, in those cases where the bond is of sufficient strength, the tire tool may be successively applied to points around the circumference of the tire to entirely loosen the tire from the rim. Alternatively, more than one tire tool may be simultaneously applied as illustrated in Figure 3. In this figure, there is illustrated a vehicle 39 having a wheel and tire assembly 40 mounted on the axle 41 thereof. When the tire 32 requires replacement or repair, the axle 41 is lifted by means of a jack 42. One or more of the tire tools 10 may then be applied as described in Figure 2. Once the tire beads 33 and 34 of the deflated tire 32 are loosened from the rim flanges 35 and 36, the tire tool, or tools, is removed. This permits the portions of the beads 33 and 34 at the top of the wheel to drop into the rim well 38 as shown in dotted lines of Figure 2. The portions of the beads 33 and 34 at the bottom of the wheel will then drop away from the rim to a position which is exaggeratedly shown by the dotted line 43 in Figure 3. The usual tire iron may then be used to lift the outer bead of the tire over the rim. Thereafter, the inner tube may be removed and repaired or the entire casing may be completely removed by inserting the tire tools between the inner tire bead and the outer rim flange to lift the bead over the rim.

Obviously, the tire casing and inner tube may be applied to the wheel by first lifting the inner bead over the rim, by inserting the inner tube and then by applying the tire tool of this invention to hold a portion of the outer bead within the rim while the balance of the bead is lifted over the outer rim flange by the usual tire iron or by an additional tire tool 10.

Figure 3 illustrates the removal or mounting of a tire on a wheel while the latter is still mounted on the vehicle axle. It is to be understood, however, that the tire tool of this invention may also be used to remove a tire from a wheel mounted on any pivotal support such as a work stand.

It will be apparent from the foregoing that the tire tool of this invention is operative for breaking bonded tire beads from the flanges of a rim without injury to the tire, thereby eliminating the usual time-consuming operation for demounting the wheel from its support such as on the axle of a vehicle. In addition, the tire tool is operative for aiding in the removal from or the mounting of a tire on a rim as the result of a locking feature on the tool which enables the clamping of one or more portions of the tire to the rim thereby permitting the operator to freely work on the balance of the tire.

While a particular embodiment of this invention only has been illustrated, it will, of course, be understood that the invention should not be limited thereto, since many modifications may be made, and, therefore, it is contemplated by the claim to cover all such modifications as fall within the scope of the present invention.

I claim as my invention:

In a tool for removing a tire from a drop center type tire rim, a pair of tire bead engaging elements secured in pivotal relationship to one another, a manipulating handle member secured to said elements and arranged to move each element toward and away from the other, into and out of engagement with a portion of the beads of a tire to urge the beads toward one another and laterally out of contact with the tire rim and means on each of the bead engaging elements for engaging the adjacent portion of the tire rim to lift the tool and the adjacent portion of the tire bead away from the tire rim simultaneously with the movement of said tire engaging elements toward one another thereby to afford a space between the tire and the rim for insertion of a tire tool.

HANS CHRISTIAN OHLSEN.